US006316551B1

United States Patent
Silvi et al.

(10) Patent No.: US 6,316,551 B1
(45) Date of Patent: Nov. 13, 2001

(54) METHOD FOR MAKING UNCOMPATIBILIZED POLYPHENYLENE ETHER-POLYAMIDE COMPOSITIONS

(75) Inventors: Norberto Silvi, Clifton Park; Mark Howard Giammattei, Selkir, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/548,253

(22) Filed: Apr. 12, 2000

Related U.S. Application Data

(62) Division of application No. 09/149,062, filed on Sep. 8, 1998, now Pat. No. 6,107,415.

(51) Int. Cl.$^7$ ..................... C08L 71/12
(52) U.S. Cl. .......... 525/397; 252/500; 524/514; 524/538; 525/66; 525/92 B; 525/133
(58) Field of Search ................... 525/397, 391, 525/66, 92 B, 133; 524/514, 538; 252/500

(56) References Cited

U.S. PATENT DOCUMENTS

| | | | | |
|---|---|---|---|---|
| 5,000,987 | * | 3/1991 | Chambers | 264/141 |
| 5,120,801 | * | 6/1992 | Chambers | 525/397 |
| 5,843,340 | * | 12/1998 | Silvi et al. | 252/511 |

* cited by examiner

*Primary Examiner*—Ana Woodward
(74) *Attorney, Agent, or Firm*—Bernadette M. Bennett; Noreen C. Johnson

(57) ABSTRACT

Compatible polyphenylene ether-polyamide blends are prepared without the need for compatibilizing compounds such as citric acid or maleic anhydride. The preparation method includes melt blending of the constituents, with other materials such as impact modifiers and fillers optionally being present, at an apparatus temperature maintained no lower than about 295° C. and a pressure maintained below about 200 torr. Blending is preferably by extrusion, with filler and optionally a portion of the polyamide being introduced downstream.

15 Claims, No Drawings

METHOD FOR MAKING UNCOMPATIBILIZED POLYPHENYLENE ETHER-POLYAMIDE COMPOSITIONS

This application is a division of application Ser. No. 09/149,062, filed Sep. 8, 1998 now U.S. Pat. No. 6,107,415 which is hereby incorporated by reference in its entirety.

BACKGROUND OF THE INVENTION

This invention relates to polyphenylene ether-polyamide blends, and more particularly to the preparation of such blends without the use of compatibilizing compounds.

Blends of polyphenylene ethers and polyamides, in which the polyamide is generally the continuous phase, are in wide commercial use in applications requiring a combination of such properties as temperature stability, impact resistance and solvent resistance, as illustrated by the fabrication of such articles as exterior body parts for automobiles. It has long been known, however, that such blends are difficult to prepare because of the incompatibility of polyphenylene ethers with polyamides. As a result of this incompatibility, such blends typically undergo phase separation and delamination and contain large, incompletely dispersed polyphenylene ether particles and no phase interaction between the two resin phases. Molded parts made from such blends are, as a result, usually characterized by extremely low impact strength, brittleness, delamination and the like.

One strategy which has been employed to improve the properties of polyphenylene ether-polyamide blends is to introduce compatibilizing compounds which facilitate copolymer formation between the two resins. Typical compatibilizing compounds contain such functional groups as olefinic, carboxylic acid, ortho ester, epoxide and chlorotriazine groups; illustrative compounds of this type are maleic anhydride, fumaric acid, trimellitic anhydride acid chloride and 2-chloro-4-(2,4,6-trimethylphenoxy)-6-glycidoxy-1,3,5-triazine. The use of such compounds is disclosed in many U.S. patents, including U.S. Pat. Nos. 4,315,086, 4,600,741, 4,732,937, 4,873,286, 5,100,961, 5,089,567 and 5,115,042.

In a typical blending method which includes the use of compatibilizing compounds, a twin screw extruder configured to provide severe mixing intensity is employed. The feed throat of the extruder is charged with polyphenylene ether, compatibilizing compound, a suitable impact modifier as detailed hereinafter, any required stabilizers and a portion of the polyamide. The polyamide is present to protect the impact modifier, often an unsaturated rubbery polymer, from degradation caused by friction-generated heat in the upstream portion of the extruder.

Extrusion in the upstream region is at a temperature high enough to cause reaction of the compatibilizing compound with the polyphenylene ether, said temperature typically being up to about 290° C. Atmospheric venting of the extruder is employed upstream. The remainder of the polyamide is introduced downstream with vacuum venting, at a temperature typically in the range of about 290–300° C.

The use of such compatibilizing compounds and conditions is, however, often accompanied by disadvantages. For example, the compatibilizing compound can also react to link polyamide molecules, causing chain lengthening or crosslinking which may impair the flow properties of the blend. Depending on their chemical nature, they can further cause corrosion of blending equipment such as extruder screws and shafts and present environmental hazards. It goes without saying that they also add to the material costs of the blending process.

The preparation of uncompatibilized polyphenylene ether-polyamide blends is disclosed in U.S. Pat. No. 3,379,792. Because of the incompatibility of the resin phases, however, such blends are disclosed as having inferior physical properties if the polyamide is present in greater amount than 20% by weight. In such blends, the polyamide serves only as a flow modifier for the polyphenylene ether. Clearly, there is no opportunity for the polyamide to constitute the continuous phase or to contribute significantly to the properties of the composition.

It is desirable, therefore, to develop new methods for compatibilization of polyphenylene ether-polyamide blends which do not require the use of compatibilizing compounds which degrade blend properties. It is especially desirable to prepare compatible blends in which the polyamide is the continuous phase.

SUMMARY OF THE INVENTION

The present invention provides compatible polyphenylene ether-polyamide blends without the use of extraneous compatibilizing compounds. That is what the word "uncompatibilized" means in the title; said blends are compatible though no compatibilizing compounds are employed in their preparation.

Said blends can contain polyamide as the external phase and have excellent physical properties, generally at least equivalent to those of known blends made with the use of such compounds. In addition, they unexpectedly demonstrate good properties regardless of whether they are subjected to short or long molding cycles.

The invention includes polyphenylene ether-polyamide compositions and a method for their preparation. Said method comprises intimately melt blending, at an apparatus temperature maintained no lower than about 295° C. and a pressure maintained below about 200 torr, a mixture comprising (A) at least one polymer having an amine end group concentration of at least about 35 microequivalents per gram and (B) at least one polyphenylene ether, said mixture being free from compatibilizing compounds reactive with both of components A and B and having a weight ratio of component A to component B greater than 1:1; at least about 15% by weight of component A being present at the initiation of the blending operation and any remainder of said component A being subsequently added during said blending operation.

The compositions of the invention ordinarily comprise copolymers of components A and B and are characterized by a weight ratio of component A to component B greater than 1:1 and the absence of any compatibilizing compounds as described above.

DETAILED DESCRIPTION; PREFERRED EMBODIMENTS

For the sake of brevity, each constituent of the compositions of this invention is designated "component" irrespective of whether it undergoes reaction with another constituent. Thus, the compositions of the invention may comprise the named components and any reaction products thereof.

Any polymer (other than a polyphenylene ether) containing amine end groups may be employed as component A in the present invention. Polyamides are particularly preferred, and will be referred to hereinafter for convenience; it should be understood, however, that other amine-terminated polymers may be employed when appropriate.

Included are polyamides prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, and of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing 2–16 carbon atoms between the amino and carboxylic acid groups, said carbon atoms forming a ring containing the —CO—NH— group in the case of a lactam. As particular examples of aminocarboxylic acids and lactams there may be mentioned $\epsilon$-aminocaproic acid, butyrolactam, pivalolactam, $\epsilon$-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

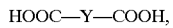

HOOC—Y—COOH, wherein Y is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhex-amethylenediamine; from adipic acid and m-xylylenediamines; from adipic acid, azelaic acid and 2,2-bis(p-aminophenyl)propane or 2,2-bis(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 46, 66, 11 and 12, most preferably polyamide-6 and 66.

Suitable dicarboxylic acids include those which contain an aliphatic or aromatic group containing at least 2 carbon atoms separating the carboxy groups. The aliphatic acids are often preferred; they include sebacic acid, octadecanedioic acid, suberic acid, glutaric acid, pimelic acid and adipic acid.

It is essential for the purposes of this invention that the polyamide have an amine end group concentration of at least about 35 microequivalents per gram ($\mu$eq/g). The preferred concentration is at least about 50 $\mu$eq/g, with 80–120 $\mu$eq/g being more preferred. In the most preferred embodiment, at least 15% by weight of total polyamide has an amine end group concentration of at least about 80 $\mu$eq/g, and for any balance thereof it is at least about 40 $\mu$eq/g.

For most purposes, the preferred polyamides by reason of their availability and particular suitability are poly (hexamethylene adipamide), hereinafter designated "polyamide-66", and poly($\epsilon$-aminocaproamide), hereinafter designated "polyamide-6". In general, polyamide-6 is preferred since the blends containing it have more consistently acceptable physical properties over a wide range of constituent proportions; however, blends with superior properties may often also be produced by the use of a mixture of polyamide-66 and polyamide-6. Polyamides having an amine end group concentration of at least about 20 microequivalents per gram are especially preferred, by reason of their suitability for compatibilization via copolymer formation with the polyphenylene ether.

The polyphenylene ethers employed as component B according to the invention are known polymers comprising a plurality of structural units of the formula

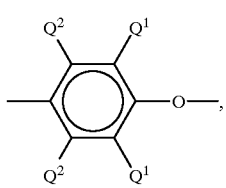

(I)

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1, 4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether has an intrinsic viscosity greater than about 0.25, most often in the range of about 0.25–0.6 and especially 0.4–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The mixtures which are melt blended according to the invention include components A and B. They are also characterized by the absence of compatibilizing compounds of the type previously found necessary for the preparation of polyphenylene ether-polyamide blends, particularly those in which the polyamide is the continuous phase. As noted hereinafter, the absence of such compounds is a major reason for the advantageous physical properties of the compositions of the invention.

Said mixtures may, however, contain constituents other than components A and B. For example, they frequently contain impact modifiers for the polyphenylene ether and/or the polyamide.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Olefin-based homopolymers and copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, acrylic acid, ethyl acrylate, methacrylic acid, methyl methacrylate and the like. Also suitable are the ionomer resins, which may be wholly or partially neutralized with metal ions.

A particularly useful class of impact modifiers consists of those derived from the vinylaromatic monomers. These include AB and ABA type block and radial block copolymers and vinylaromatic conjugated diene core-shell graft copolymers.

An especially preferred subclass of vinyl aromatic monomer-derived resins is the block copolymers comprising monoalkenylarene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and UK Patent 1,264,741, all incorporated herein by reference. Examples of typical species of AB block copolymers include polystyrene-polybutadiene (SBR), polystyrene-polyisoprene and poly (alpha-methylstyrene)-polybutadiene. Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, all incorporated herein by reference. Examples of triblock copolymers include polystyrene-polybutadiene-polystyrene (SBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as CARIFLEX, KRATON D and KRATON G from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480, 3,000,866, 3,407,158, 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or 55 more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and described in U.S. Pat. No. 3,944,631.

In addition, there may be employed the above-described polymers and copolymers having copolymerized therewith or grafted thereon monomers having functional groups and/or polar or active groups, provided the polymers containing said groups do not interreact with and serve as compatibilizing compounds for the polyphenylene ether and polyamide. Finally, other suitable impact modifiers include Thiokol rubber, polysulfide rubber, polyurethane rubber, polyether rubber (e.g., polypropylene oxide), ethylene-propylene rubber, thermoplastic polyester elastomers and thermoplastic ether-ester and ether-amide elastomers.

Further constituents that may be present in the compositions of the invention include lubricating agents effective to densify the polyphenylene ether, fillers and conventional stabilizers. Suitable lubricants include low molecular weight hydrogenated α-olefin polymers. Any art-recognized extending and reinforcing fillers may be employed; examples are silicates, titanium dioxide, glass fibers, carbon fibers, carbon black, graphite, calcium carbonate, talc and mica. Electrically conductive fillers such as graphite fibrils are often preferred, especially for compositions to be used for the fabrication of parts such as external automotive parts which are to be painted by electrostatic methods.

For the preparation of copolymer compositions according to this invention, a melt blending method which results in the formation of an intimate blend is required. Conventional melt blending procedures and equipment may be employed, with extrusion often preferred because of its relative convenience and particular suitability.

The temperature at which the apparatus is set, typically the extruder barrel temperature, is maintained no lower than about 295° C. and the maximum is just below the decomposition temperature of any component, with preferred temperatures being in the range of about 295–325° C. Combined with other factors such as friction, this may produce a resin temperature during blending from about 295° C. to as high as about 350° C.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; counterrotating, non-intermeshing twin screw extruders having screws which include forward-flighted compounders, cylindrical bushings and/or left-handed screw elements; corotating, intermeshing twin screw extruders; and extruders having screws which include at least one and preferably at least two sections of kneading block elements. When blending is by extrusion, any materials present at the initiation of the blending operation are introduced through the feed port of the extruder and any materials subsequently added may be introduced through a downstream port therein.

According to the invention, blending is conducted under reduced pressure. In the case of extrusion, this may be achieved by vacuum venting. The blending pressure is maintained at or below about 200 torr, with about 100–150 torr being preferred. At pressures higher than 200 torr, a significant degradation of physical properties such as impact strength is observed.

The invention also includes a specific mode of introduction of components. At least about 15% of the polyamide is present with the polyphenylene ether at the initiation of the blending operation. Other materials such as impact modifier are generally also present at the initiation of the operation. Subsequent introduction of at least about 20% of the polyamide later in the operation, as well as any filler employed, is highly preferred since such an introduction maximizes physical properties such as impact strength and tensile elongation The proportions of constituents of the composition of this invention are not critical except that component A forms the continuous phase of the polymer blend and is present in major proportion; i.e., the weight ratio of component A to component B is greater than 1:1. Preferably, it is in the range of about 1–3:1; most preferably, about 1.2–1.5:1. Impact modifier and filler, when employed, are typically present in the respective amounts of about 2–25 and about 1.0–2.0 (preferably about 1.0–1.2 for optimum conductivity) parts per 100 parts of resinous constituents (phr). Lubricant, when used, is generally in the amount of about 1–3 phr.

As previously mentioned, the compositions of the invention comprise copolymers of the polyphenylene ether and polyamide, as shown by high pressure liquid chromatography. The precise bonding in existence in such copolymers is not known. However, the presence of copolymer molecules provides compatibilization of the same type obtained through more conventionally formed copolymers, such as those produced by the use of compatibilizing compounds.

Scanning and transmission electron microscopy of molded compositions of this invention show them to have polyphenylene ether particles well dispersed in the polyamide continuous phase. The volume average particle diameter is typically in the range of about 1.0–3.0 microns, with little change in particle size with variation of molding conditions.

Compositions prepared under prior art conditions but without the use of a compatibilizing compound typically have particle diameters above 5 microns. It is often observed that molded parts made from the compositions of the invention by way of long and abusive molding cycles have morphologies similar to parts made by short cycle molding of compositions made with the use of a compatibilizing compound. Compositions prepared under the conditions of the present invention with the use of citric acid as a compatibilizer also typically have particle diameters at least 25% greater than those prepared by the method of the invention, whether molded under normal or abusive conditions.

The invention is illustrated by the following examples. All parts and percentages are by weight. The polyphenylene ethers employed were all poly(2,6-dimethyl-1,4-phenylene ethers). Intrinsic viscosities of polyphenylene ethers were determined in chloroform at 25° C. Proportions of specific polyamides are based on the total weight of polyamide, and proportions designated as being introduced upstream are based on the specific polyamide so identified. Impact strengths were determined in English units and converted to metric units, on parts injection molded (12 sec) at 299° C.(melt) and 88° C. (tool), and were determined using one or more of the following sets of conditions:

RH: 28 sec cooling, impact tested at 22.8° C.

LH: 58 sec cooling, impact tested at 22.8° C.

RC: 28 sec cooling, impact tested at –30° C.

LC: 58 sec cooling, impact tested at –30° C.

The following constituents were employed:

PPE: a commercially available polyphenylene ether having an intrinsic viscosity of 0.46 dl/g.

PPE(x): polyphenylene ethers having intrinsic viscosity values of x dl/g as designated in parentheses.

PA6(y), PA66(y): commercially available polyamides-6 or 66 having amine end group concentrations of y $\mu$eq/g as designated in parentheses.

IM(1): a commercially available styrene-butadiene block copolymer commercially available from Dexco under the trade name "VECTOR V8508D" or a similar block copolymer available as "VECTOR 2518", used as an impact modifier.

IM(2): a commercially available hydrogenated styrene-butadiene block copolymer commercially available from Shell under the trade name "KRATON G1702", used as an impact modifier.

IM(3): a commercially available hydrogenated styrene-butadiene block copolymer commercially available from Shell under the trade name "KRATON G1651", used as an impact modifier.

Lubricant: hydrogenated ?-olefin polymer supplied by Amoco under the designation "Durasyn 168".

EXAMPLES 1–6

Blends of 36.3 parts of PPE(0.46), 48.5 parts of PA6 (88.2), 15.2 parts of IM(1), 1 phr of lubricant and 0.3 phr of a commercially available stabilizer were prepared in a twin screw extruder maintained at a uniform extruder barrel temperature of 305° C. and a pressure of 100–150 torr regulated through upstream and downstream vents. The PPE, impact modifier, lubricant, stabilizer and a portion of the polyamide were introduced at the feed throat of the extruder, with the remaining polyamide being introduced through a downstream port.

The extrudates were injection molded into test specimens and tested for various properties including notched Izod impact strength (ASTM procedure D256), falling dart (Dynatup) impact strength (ASTM method D3763) and (for certain examples) steady state capillary shear viscosity at 288° C./1000 sec$^{-1}$.

Comparison was made with two controls: Control A (CA) which was extruded under prior art conditions applicable to the use of a compatibilizing compound (i.e., extruder temperatures in the range of 260–293° C., atmospheric venting through the upstream port and vacuum venting through the downstream port) but without the presence of a compatibilizer, and Control B (CB) which employed 0.6 part of citric acid but which was extruded under the same conditions as the compositions of the invention. The results are given in Table I.

of CA, extruded under conventional conditions. In addition, the falling dart impact strengths of the compositions of the invention are for all practical purposes equivalent, under all molding conditions, to those of CB and the Izod impact strengths show the same trend except, possibly, for the product of Example 6, showing that the method of the invention does not require the presence of a compatibilizer. The somewhat less advantageous Izod values of the product of Example 6 demonstrate the advantage of introducing part of the polyamide downstream.

Further, ductility properties in the falling dart test are similar to those obtained from compatibilizer-containing blends, and the shear viscosities of the compositions of the invention are shown to be lower than that of CB, indicating superior flow properties.

EXAMPLES 7–18

The procedure of Examples 1–6 was repeated, substituting a different impact modifier, IM(2), for IM(1) and employing various polyamides. The lubricant proportion was maintained uniformly at 2 phr. The results are given in Table II.

TABLE I

| | Example | | | | | | | |
|---|---|---|---|---|---|---|---|---|
| | 1 | 2 | 3 | 4 | 5 | 6 | CA | CB |
| Polyamide upstream, % | 50 | 50 | 25 | 50 | 75 | 100 | 25 | 25 |
| Izod impact strength, J/m, RR/LH/RC/LC | 213.6/—/—/— | 245.6/—/133.5/— | 603.4/379.1/240.3/213.6 | 662.2/384.5/240.3/213.6 | 534.0/646.1/218.9/186.9 | 160.2/138.8/69.4/69.4 | 374/—/—/— | 731.6/747.6/283.0/299.0 |
| Falling dart impact strength, total energy, J, RH/LH/RC/LC | 57.0/—/—/— | 59.7/—/58.3/— | 59.7/59.7/52.9/59.7 | 65.1/67.8/59.7/54.2 | 67.8/71.9/71.9/67.8 | 46.1/61.0/38.0/27.1 | 8.1/—/—/— | 48.8/57.0/55.6/66.4 |
| Shear viscosity, Pa.- sec | — | — | 365 | 401 | 356 | 383 | — | 473 |

It is apparent that the RH Izod impact strengths of the compositions of the invention are uniformly superior to that

TABLE 11

| | Example | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| PA6 (88.2), % | 100 | 75 | 50 | 25 | — | 75 | 50 | 25 | — | — | — | — |
| Upstream, % | 75 | 75 | 50 | 25 | — | 75 | 50 | 25 | — | — | — | — |
| PA6 (120), % | — | — | — | — | — | — | — | — | — | 100 | 50 | 50 |
| Upstream, % | — | — | — | — | — | — | — | — | — | 75 | 50 | 50 |
| PA66 (55), % | — | 25 | 50 | 75 | 100 | — | — | — | — | — | 50 | — |
| Upstream, % | — | 0 | 25 | 50 | 75 | — | — | — | — | — | 25 | — |
| PA66 (103), % | — | — | — | — | — | 25 | 50 | 75 | 100 | — | — | 50 |
| Upstream, % | — | — | — | — | — | 0 | 25 | 50 | 75 | — | — | 25 |
| lzod impact strength, J/m, RH/LH/RC | 453.9/699.5/256.3 | 218.9/213.6/122.8 | 208.2/176.2/128.2 | 208.2/160.2/122.8 | 160.2/149.5/106.8 | 432.5/389.8/256.3 | 304.4/320.4/240.3 | 261.7/208.2/213.6 | 213.6/213.6/170.9 | 598.1/416.5/186.9 | 208.2/170.9/122.8 | 277.7/283.0/245.6 |
| Falling dart impact strength, total energy, J, RH/LH/RC | 51.5/52.9/57.0 | 48.8/46.1/51.5 | 48.8/47.5/42.0 | 40.7/48.8/33.9 | 47.5/47.5/32.5 | 50.2/50.2/57.0 | 52.9/50.2/59.7 | 50.2/46.1/54.2 | 51.5/48.8/58.3 | 48.8/48.8/58.3 | 51.5/47.5/42.0 | 52.9/48.8/58.3 |

It can be seen from Table II that the products of all examples have generally acceptable Izod and falling dart impact strengths. However, significantly higher values are frequently observed when polyamides having an amine end group concentration above 80 μeq/g are employed. Full ductility is generally observed in the falling dart test for samples evaluated at 22.8° C.

EXAMPLES 19–23

The procedure of Examples 7–18 was repeated, with the use of polyphenylene ethers of varying molecular weights and/or variation of constituent proportions. In each example, 75% of the polyamide was introduced upstream. The results are given in Table III.

TABLE III

| | Example | | | | |
|---|---|---|---|---|---|
| | 19 | 20 | 21 | 22 | 23 |
| PPE, % | 41.4 | 46.4 | 46 | — | — |
| PPE (0.40), % | — | — | — | 46.0 | — |
| PPE (0.30), % | — | — | — | — | 46.0 |
| PA6 (88.2), % | 48.5 | 48.5 | — | — | — |
| PA66 (103), % | — | — | 44.0 | 44.0 | 44.0 |
| IM (2), % | 10.1 | 5.1 | 10.0 | 10.0 | 10.0 |
| Izod impact strength, J/m, RH/LH/RC | 315.1/ 411.2/ 202.9 | 224.3/ 176.2/ 128.2 | 208.3/—/ 133.5 | 208.3/—/ 149.5 | 208.3/—/ 128.2 |
| Falling dart impact strength, total energy, J, RH/LH/RC | 55.6/ 55.6/ 59.7 | 65.1/ 63.7/ 39.3 | 44.7/—/ 20.3 | 52.9/—/ 24.4 | 50.2/—/ 20.3 |

These examples show that the physical properties of blends containing polyphenylene ethers of differing molecular weights and having different proportions of constituents remain at least adequate. They also show the superiority in physical properties of a blend containing polyamide-6 as compared with polyamide-66.

EXAMPLES 24–26

The procedure of Examples 7–18 was repeated using PA6(88.2) (75% introduced upstream) and IM(1) [IM(2) in Example 26], with variation of certain proportions and with the addition of carbon fibrils as a conductive filler. The filler was added downstream in the form of a 20% concentrate in a commercially available polyamide-66 as diluent; filler proportions are exclusive of diluent. The results are given in Table IV.

TABLE IV

| | Example | | |
|---|---|---|---|
| | 24 | 25 | 26 |
| PPE (0.46), % | 36.3 | 48.8 | 46.0 |
| PA6 (88.2), % | 48.5 | 41.2 | 44.0 |
| IM (1), % | 15.2 | 10.0 | 10.0 |
| Filler, phr | 1.5 | 1.5 | 1.35 |
| Izod impact strength, J/m, RH/RC | 240.3/ 106.8 | 64.1/ 64.1 | 181.6/ 133.5 |
| Falling dart impact strength, total energy, J, RH/RC | 58.3/ 43.4 | 46.1/ 9.5 | 50.2/ 35.3 |
| Bulk electrical resistivity, KΩ-cm | 38.2 | 15.2 | 714.4 |

It is apparent that the physical properties of the products of Examples 24 and 26 are acceptable. The product of Example 25 was brittle and had low Izod values, but its falling dart value under RH conditions was acceptable, suggesting utility in any of the many environments where impact strength at low temperatures is not a critical factor. Resistivity values are acceptably low for all three examples, but are better in Examples 24 and 25 where the filler is present at a level of 1.5 phr.

EXAMPLES 27–30

Blends having the same proportions and containing similar, or in some instances identical, constituents to those of Examples 7–18 were prepared by extrusion at similar temperatures and injection molded at a melt temperature of 313° C. and a mold temperature of 88° C. and cooling and cycle times of 30/46 sec ("regular" cycle) or 120/136 sec ("long" cycle). The results are given in Table V.

TABLE V

| | Example | | | |
|---|---|---|---|---|
| | 27 | 28 | 29 | 30 |
| PA6 (88.2), % | 0 | 0 | 100 | 50 |
| Upstream, % | 0 | 0 | 75 | 100 |
| PA66 (103), % | 100 | 100 | 0 | 50 |
| Upstream, % | 75 | 50 | 0 | 50 |
| Izod impact strength, J/m, regular/long | 202.9/ 128.2 | 251.0/ 117.5 | 795.7/ 694.2 | 320.4/ 176.2 |
| Falling dart impact strength, total energy, J, regular/long | 47.5/ 39.3 | 47.5/ 35.3 | 48.8/ 44.7 | 47.5/ 44.7 |

It is shown by these examples that physical properties are reasonably consistent irrespective of molding conditions. The Izod values for the product of Example 29, prepared entirely from polyamide-6, are particularly notable.

EXAMPLES 31–34

Blends of 25.3% PPE(0.40), 66.6% of various blends of PA6(88.2) (all introduced upstream) and PA66(38) (all introduced downstream), 8.1% IM(3) and various additives in conventional minor proportions were extruded and molded under conditions similar to those of Examples 1–6. The results are given in Table VI.

TABLE VI

| | Example | | | |
|---|---|---|---|---|
| | 31 | 32 | 33 | 34 |
| PA6 (88.2), % | 15.2 | 25.8 | 38.0 | 51.7 |
| Izod impact strength, J/m, RH/RC | 128.2/ 48.1 | 154.9/ 64.1 | 149.5/ 69.4 | 181.6/ 90.8 |
| Falling dart impact strength, total energy, J, RH | 22.0 | 31.3 | 36.7 | 44.7 |

What is claimed is:

1. A method for preparing a polyphenylene ether-polyamide composition which comprises intimately melt blending, at an apparatus temperature maintained no lower than about 295° C. and a pressure maintained below about 200 torr, a mixture comprising a first component (A) wherein A comprises at least one polymer having an amine end group concentration of at least about 35 microequivalents per gram and a second component (B) wherein B comprises at least one polyphenylene ether, said mixture being free from compatibilizing compounds and having a weight ratio of component A to component B greater than 1:1;

at least about 15% by weight of component A being present at the initiation of the blending operation and any remainder of said component A being subsequently added during said blending operation.

2. The method according to claim 1 wherein the polyphenylene ether is a poly(2,6-dimethyl-1,4-phenylene ether).

3. The method according to claim 2 wherein component A is a polyamide having an amine end group concentration of at least about 50 microequivalents per gram.

4. The method according to claim 3 wherein the polyamide has an amine end group concentration in the range of about 80–120 microequivalents per gram.

5. The method according to claim 3 wherein the polyamide is a polyamide-6.

6. The method according to claim 3 wherein the polyamide is a polyamide-66.

7. The method according to claim 1 wherein the pressure is in the range of about 100–150 torr.

8. The method according to claim 1 wherein at least about 20% of component A is subsequently added.

9. The method according to claim 1 wherein an impact modifier is also present.

10. The method according to claim 9 wherein the impact modifier is present at the initiation of the blending operation.

11. The method according to claim 1 wherein a filler is also present.

12. The method according to claim 11 wherein the filler is subsequently added after the initiation of the blending operation.

13. The method according to claim 11 wherein the filler is electrically conductive.

14. The method according to claim 1 wherein the blending is by extrusion.

15. The method according to claim 14 wherein materials present at the initiation of the blending operation are introduced through the feed port of an extruder and materials subsequently added are introduced through a downstream port therein.

* * * * *